(12) United States Patent  
Potagnik et al.

(10) Patent No.: US 8,649,920 B2
(45) Date of Patent: Feb. 11, 2014

(54) METHOD AND DEVICE FOR AUTOMATICALLY MONITORING LATERAL GUIDANCE ORDERS OF AN AIRCRAFT

(75) Inventors: Nicolas Potagnik, Toulouse (FR); Jean Muller, Tournefeuille (FR); Florent Lanterna, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 69 days.

(21) Appl. No.: 13/313,810

(22) Filed: Dec. 7, 2011

(65) Prior Publication Data

US 2012/0150368 A1 Jun. 14, 2012

(30) Foreign Application Priority Data

Dec. 9, 2010 (FR) ..................................... 10 60313

(51) Int. Cl.
*G06F 19/00* (2011.01)
*G06G 7/00* (2006.01)

(52) U.S. Cl.
USPC ....... 701/14; 701/8; 701/9; 714/11; 714/47.1; 714/57

(58) Field of Classification Search
USPC ......... 701/3, 14, 4, 8, 9; 714/10–12, 47.1, 48, 714/57; 340/963
See application file for complete search history.

(56) References Cited

U.S. PATENT DOCUMENTS

| 4,916,612 | A | * | 4/1990 | Chin et al. ........................ 701/3 |
| 6,550,018 | B1 | | 4/2003 | Abonamah et al. |
| 2007/0299568 | A1 | | 12/2007 | Rouquette et al. |
| 2010/0312420 | A1 | * | 12/2010 | Sham et al. ....................... 701/3 |

FOREIGN PATENT DOCUMENTS

EP 1679567 7/2006

OTHER PUBLICATIONS

French Patent Office, French Search Report FR 10 60313, Aug. 12, 2011 (2 pgs).

* cited by examiner

*Primary Examiner* — Thomas Tarcza
*Assistant Examiner* — Kevin Myhre
(74) *Attorney, Agent, or Firm* — Wood, Herron & Evans, LLP

(57) ABSTRACT

A monitoring device automatically monitors lateral guidance orders of an aircraft. The device includes a failure monitoring device for implementing comparisons between roll control orders generated by a number of equipments in order to be able to detect a failure of one of the equipments concerning the generation of lateral guidance orders of the aircraft. Additionally, the device includes a failure anticipation comparator device for analyzing inlet parameters of the equipments to determine when a failure of one of the equipments should be anticipated.

17 Claims, 2 Drawing Sheets

METHOD AND DEVICE FOR AUTOMATICALLY MONITORING LATERAL GUIDANCE ORDERS OF AN AIRCRAFT

TECHNICAL FIELD

The present invention relates to a method and a device for automatically monitoring lateral guidance orders of an aircraft, in particular of a transport airplane.

BACKGROUND

The present invention applies to the monitoring of lateral guidance orders being provided for a flight control system of the aircraft and being generated by a calculation stage for lateral guidance orders of an aircraft guidance system. Such a calculation stage comprises, in general, more specifically:
- a large feedback loop, determining, from guidance parameters, a turning initiation order corresponding to a roll control order; and
- a small feedback loop, determining, from said roll control order, lateral guidance orders of the aircraft, provided for said flight control system.

Although not exclusively, the present invention more particularly applies to operations with required navigation performance with authorization required, of the Required Navigation Performance with Authorization Required ("RNP AR") type. These RNP AR operations are based on a surface navigation of the aRea NAVigation ("RNAV") type and on required navigation performance operations of the Required Navigation Performance ("RNP") type. These operations have the particular feature of requiring a special authorization for being able to be implemented on an aircraft.

The RNAV type surface navigation allows an aircraft to fly from a waypoint to another waypoint, and no longer from ground stations (of radio-navigation means of the NAVAID type) to other ground stations.

As known, the RNP concept corresponds to a surface navigation, for which (on board the aircraft) monitoring and warning devices are added, allowing to ensure that the aircraft remains in a corridor, referred to as RNP, around a reference trajectory and authorizing taking into consideration curved trajectories. Outside this corridor, potentially relief or other aircrafts could be present. The performance required for a RNP operation type is defined by a RNP value representing half the width (in nautical miles: NM) of the corridor around the reference trajectory, in which the aircraft should remain 95% of the time during the operation. A second corridor (around the reference trajectory) of half a width twice the RNP value is also defined. The probability that the aircraft goes out of this second corridor should be lower than 10-7 per hour of flight.

The concept of RNP AR operations is still even more stringent. The RNP AR procedures are indeed characterized by:
- RNP values:
  - being lower than or equal to 0.3 NM in approach, and that could go down to 0.1 NM; and
  - being strictly lower than 1 NM at the start and during a throttling up, and that could also go down to 0.1 NM;
- a final approach segment that could be curved; and
- obstacles (mountains, traffic, . . . ) that could be located at twice the RNP value with respect to the reference trajectory, while for usual RNP operations, an additional margin with respect to obstacles is provided.

The air authorities have defined a target level of safety TLS of 10-7 per operation, whatever the type. In the case of RNP AR operations, as the RNP values can go down to 0.1 NM and the obstacles could be located at twice the RNP value of the reference trajectory, this objective results in a probability that the aircraft goes out of the half-width corridor D=2.RNP that should not exceed 10-7 per procedure.

The equipment embedded on board aircraft (flight management system, inertial unit, devices for updating GPS data and devices for guiding the autopilot), as well as known architecture, do not allow to reach the target level of safety, if mitigation operational means are not provided, including for detecting and managing possible breakdowns. This is why a special authorization is required for this type of operation, so as to ensure that the operational procedures and the pilots' training allow the target level of safety to be reached. Moreover, as the crew should take in charge some breakdowns, the aircrafts are currently not able to guarantee a RNP value of 0.1 NM in a breakdown situation, as the crew are not able to meet the performance requirements in manual piloting.

On current aircrafts, the monitoring of RNP AR operations is implemented by means of two known functions, that is:
- a first function monitoring the accuracy and the integrity of the position calculation:
  - the accuracy of the position is compared to a threshold of the RNP value;
  - the integrity is compared to a threshold of twice the RNP value; and
    - if one of the two parameters, accuracy or integrity, exceeds the allotted threshold, a warning is emitted and the crew should take appropriate actions; and
- a second function allowing the crew to monitor the guidance of the aircraft:
  - the lateral and vertical deviations of the aircraft with respect to the reference trajectory are displayed and shown to the crew;
  - the crew monitors the deviations compared to the budgets allotted for each deviation. If the crew detects an excessive deviation, the crew should keep the aircraft under control again and take the adequate corrective actions.

As set forth previously, the current aircraft is not able to guarantee a RNP value of 0.1 NM in a breakdown situation and the crew should be trained specially for flying the RNP AR procedures. The crew should, indeed, be able to detect and process adequately breakdowns being able to compromise the ongoing operation.

The objective for future aircrafts is to be able to fly RNP AR procedures with RNP values up to 0.1 NM, and this without restriction (in a normal situation and in the case of a breakdown) in start, approach and throttling up phases. To this end, the crew should no longer be considered as the main impetus for detecting and processing breakdowns.

As set forth above, an aircraft is generally provided with a guidance system comprising at least one calculation stage for guidance orders, being intended to assist a flight control system of the aircraft. Now, for the aircraft to have the ability to fly particular procedures and including RNP AR procedures, it is necessary to be able to remove from the guidance loop an erroneous source of calculation for guidance orders, so as to counteract any detrimental possible effects on the trajectory of the aircraft.

The present invention aims at providing such a solution allowing detecting an erroneous source of calculation of lateral guidance orders. It relates to a method for automatically monitoring the lateral guidance orders of an aircraft, in particular of a transport airplane, being provided with at least one calculation stage for guidance orders, intended for a flight control system of the aircraft.

SUMMARY OF THE INVENTION

To this end, according to the invention, said method for monitoring the lateral guidance orders of an aircraft being provided with at least one calculation stage for lateral guidance orders, said calculation stage comprising:

- at least one large feedback loop, determining, from guidance parameters, a turning initiation order corresponding to a roll control order; and
- at least one small feedback loop, determining, from said roll control order, said lateral guidance orders of the aircraft, intended for the flight control system, is remarkable in that:

- on said calculation stage for lateral guidance orders an architecture is provided comprising at least N pieces of equipment, each of which is provided at least with one large feedback loop and is able to generate, in outlet of the associated large feedback loop, a roll control order, N being an integer higher than or equal to 3;
- automatically and repeatedly, comparisons are made, comparing therebetween, two to two, the roll control orders generated by said N pieces of equipment;
- from these comparisons, if applicable, a piece of equipment with failure is determined concerning the generation of lateral guidance orders of the aircraft; and
- when one piece of equipment has a failure, at least one corresponding warning is emitted in the cockpit of the aircraft.

Thus, thanks to the invention, comparisons are made between the roll control orders generated by said N pieces of equipment so as to be able to detect a diverging source as soon as an error occurs, that is as soon as a piece of equipment is failing concerning the generation of lateral guidance orders. Furthermore, as detailed herein below, this detection of a failure is reliable.

The determination and the exclusion of the source of erroneous lateral guidance orders allow, more specifically, the following objectives to be met, consisting in:

- informing the crew about the piece of equipment with a failure (or becoming defective);
- avoiding use of a source, with a proven failure; and
- avoiding going on to use a source, with a proven failure; and
- preparing the maintenance operations for the replacement of the piece of equipment with a failure.

Advantageously, for each piece of equipment:

- the deviations are calculated between the roll control order generated by this piece of equipment and each of the control orders generated by each of the other pieces of equipment;
- each of the thus calculated deviations is compared to a monitoring threshold; and
- it is considered that said piece of equipment has a failure if all the corresponding deviations are higher than said monitoring threshold.

In addition, in a preferred embodiment, providing for an anticipation of the detection of a failure, for at least one inlet parameter of said large feedback loops, the following operations are additionally implemented:

- comparisons are made, comparing therebetween, two to two, the values relative to said inlet parameter, used respectively by said equipment; and
- from these comparisons, if applicable, a piece of equipment is determined, in anticipation of failing concerning the generation of lateral guidance orders of the aircraft.

In this preferred embodiment, advantageously, for each piece of equipment:

- the deviations are calculated between the value of the inlet parameter being considered, used by this piece of equipment, and each one of the values of said inlet parameter, used by each of the other pieces of equipment;
- each of the thus calculated deviations is compared to an auxiliary monitoring threshold; and
- it is considered that said piece of equipment has a failure if all the corresponding deviations are higher than said auxiliary monitoring threshold.

Preferably, at least one of the following inlet parameters is used:

- a deviation of position of the aircraft with respect to the trajectory, which affects the roll control order for correcting this deviation;
- a deviation of orientation of the aircraft with respect to the trajectory, which affects the roll control order; and
- a nominal roll representing the roll control order applicable by default for a next turn.

Said nominal roll is calculated in phase lead compared to the next turn. Its monitoring allows a building failure of the trajectory to be anticipated. This information may be employed for invalidating a defective piece of equipment before it could generate an erroneous roll control order.

In a particular embodiment, the values of several of said inlet parameters are simultaneously analyzed for monitoring a piece of equipment concerning the generation of lateral guidance orders. By way of illustration, the monitoring of the above mentioned position and orientation deviations, if they are combined, allows identifying a problem of definition for the flight plane or the trajectory built therefrom. Their impact is instantaneous on the roll control order.

Furthermore, advantageously, when a defective piece of equipment is detected, the maintenance devices are notified about this failure, so as to prepare appropriate maintenance operations for replacing or repairing this piece of equipment with a failure.

In addition, advantageously it is considered that a piece of equipment is confirmed to be failing if all the corresponding deviations are higher than the threshold being considered (monitoring threshold or auxiliary monitoring threshold) for a predetermined period of time.

The present invention also relates to a device for automatically monitoring lateral guidance orders of an aircraft, in particular of a transport airplane, being provided with at least one calculation stage for lateral guidance orders provided for a flight control system of the aircraft.

According to the invention, said device of the type comprising at least one calculation stage for lateral guidance orders, said calculation stage comprising:

- at least one large feedback loop, determining, from guidance parameters, a turning initiation order; and
- at least one small feedback loop, determining, from said turning initiation order, lateral guidance orders of the aircraft, provided for the flight control system, is remarkable in that:

- said calculation stage has an architecture comprising at least N pieces of equipment, each of which is provided at least with one large feedback loop and is able to generate, in outlet of the associated large feedback loop, a roll control order, N being an integer higher than or equal to 3;
- said device further comprises a failure monitoring device being formed so as to make, automatically and repeatedly, comparisons, comparing therebetween, two to two, the roll control orders generated by said N pieces of equipment, and to determine, if applicable, from these comparisons, a piece of equipment being failing concerning the generation of lateral guidance orders of the aircraft; and alarm devices for emitting at least one corresponding warning in the cockpit of the aircraft, when a piece of equipment is regarded as having a failure.

In a preferred embodiment, said failure monitoring device comprises a failure anticipation comparator device for determining, if applicable, anticipatively, a piece of equipment starting to fail (concerning the generation of lateral guidance orders of the aircraft).

Preferably, said failure anticipation comparator device is formed so as to make, for at least one inlet parameter of said large feedback loops, comparisons, for instance a position or orientation deviation or a nominal roll, comparing therebetween, two to two, the values relative to said inlet parameter, used respectively by said piece of equipment, and to determine, if applicable, from these comparisons, anticipatively, a piece of equipment starting to fail concerning the generation of lateral guidance orders of the aircraft.

The present invention also relates to:
  a guidance system comprising a monitoring device such as mentioned herein above; and/or
  an aircraft, in particular a transport airplane, being provided with such a guidance system and/or such a monitoring device.

BRIEF DESCRIPTION OF THE DRAWINGS

The FIGS. of the appended drawings will better explain how this invention can be implemented. In these FIGS., like reference numerals relate to like components.

DETAILED DESCRIPTION

Figure 1:
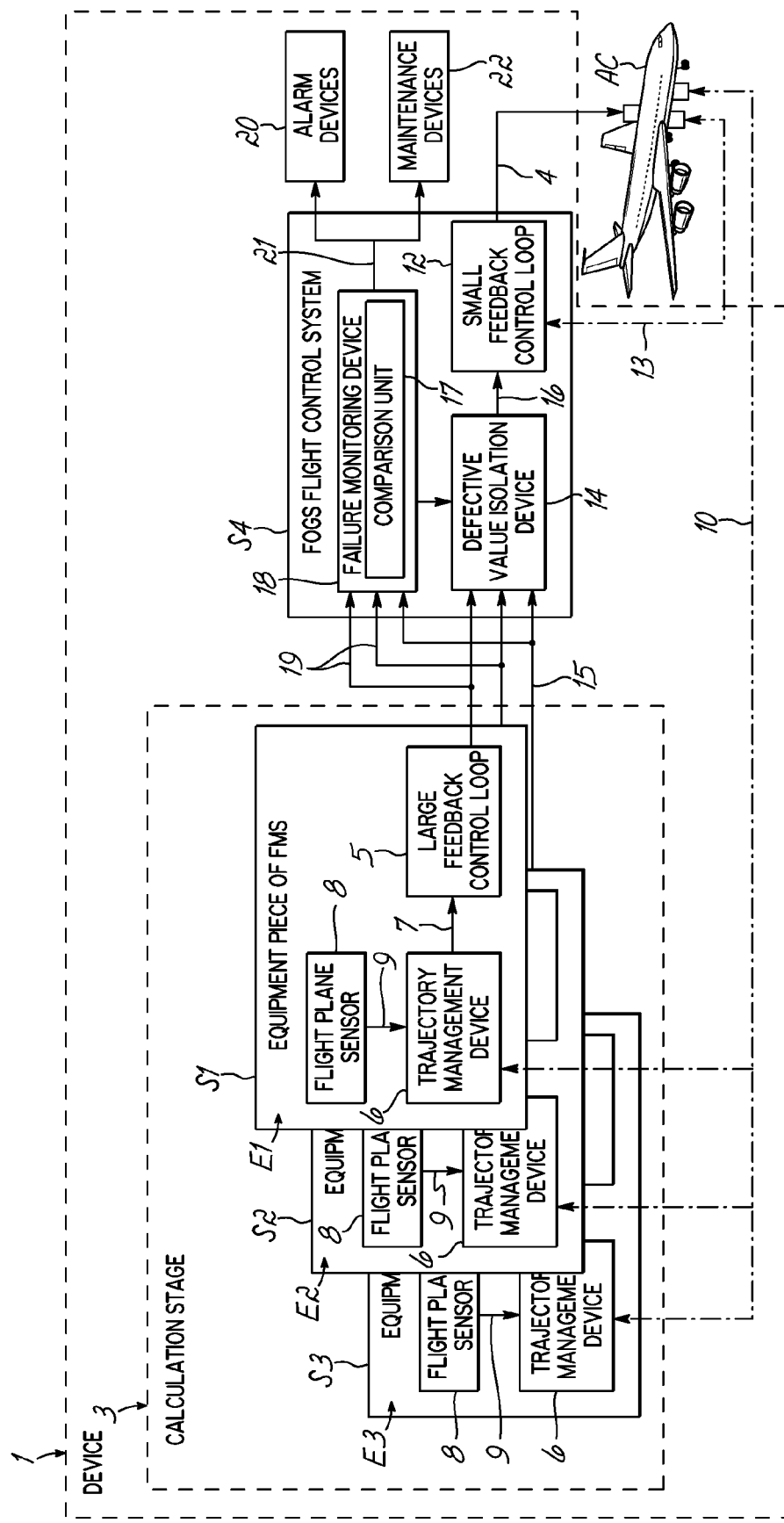
FIG. 1 is a block diagram of a first embodiment of a device according to this invention.
Figure 2:
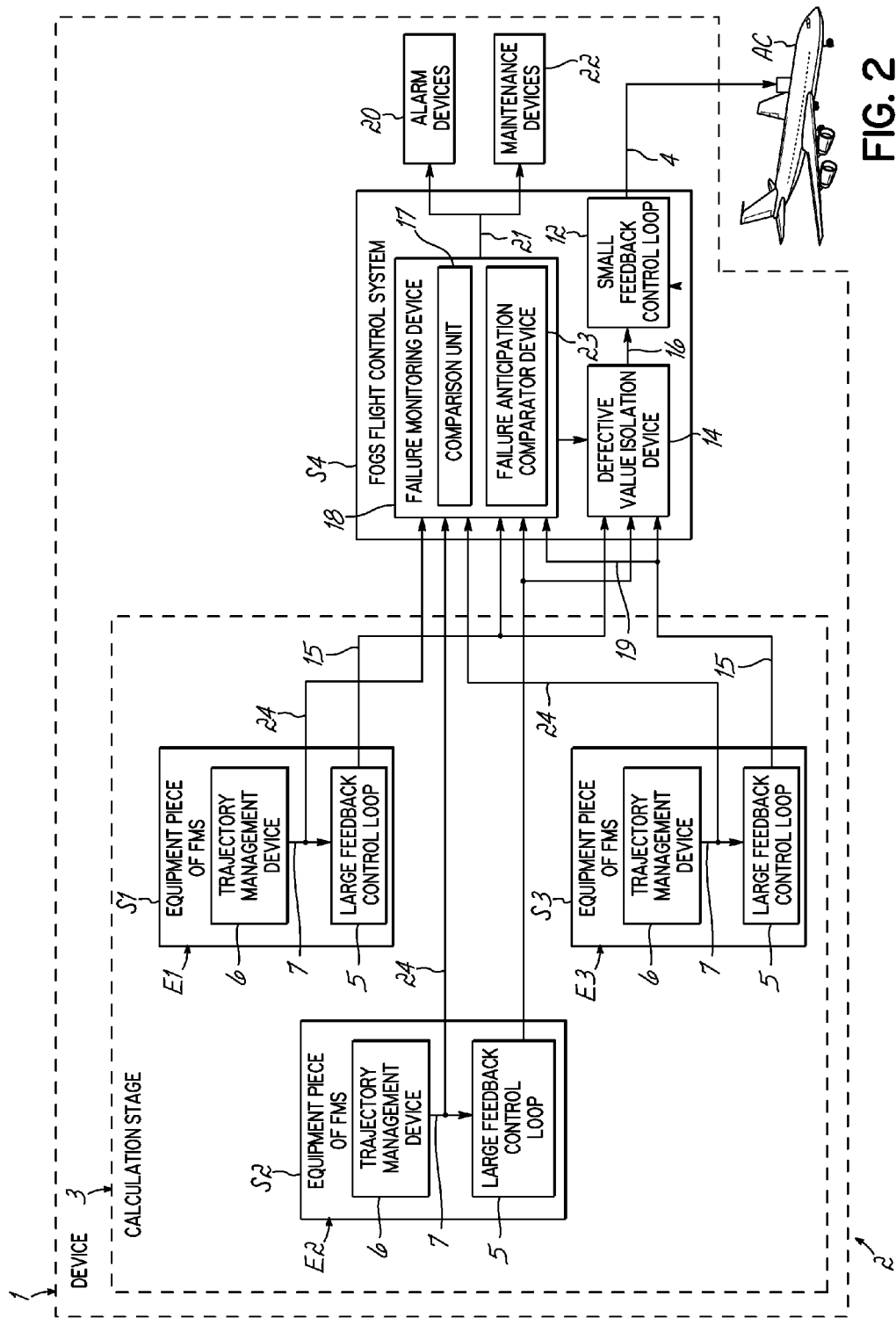
FIG. 2 is a block diagram of a second embodiment of a device according to this invention.

The device 1 according to this invention and schematically shown on FIGS. 1 and 2 is intended for automatically monitoring the lateral guidance orders of an aircraft AC, in particular a transport airplane.

The device 1 being on-board the aircraft AC includes at least one calculation stage 3 for lateral guidance orders, being intended for use by a known flight control system of the aircraft, as illustrated by a link 4 on the FIGS. The device 1 could, in particular, be used so as to help carrying out air operations with required navigation and guidance performance, and more specifically RNP AR operations.

A calculation stage 3 for lateral guidance orders includes:
  at least one large feedback loop 5, usually determining, from guidance parameters, a turning initiation order corresponding to a roll control order. These guidance parameters are received from trajectory management device 6, via a link 7. The trajectory management devices 6 use, for their processings, the flight plane received by the flight plane sensor 8 via a link 9, as well as the data of attitude and position of the aircraft received from sensors and calculation devices as illustrated by a link 10 in mixed lines on FIG. 1; and
  at least one small feedback loop 12 determining, usually, from said roll control order and from data coming from actuators and sensors (as illustrated by a link 13 in mixed lines), said lateral guidance orders of the aircraft AC, provided for the flight control system.

Consequently, from information present in the flight plane and the data reflecting more specifically the position of the aircraft AC with respect to the desired trajectory, the transfer function of the large feedback loop 5 calculates a turning initiation order of the aircraft AC. This order is afterwards transmitted to the transfer function of the small feedback loop 12 for slaving the aircraft AC.

Furthermore, in a particular embodiment, a passivation device in the form of a defective value isolation device 14 to be further detailed below are arranged between the feedback loops 5 and 12, to which they are linked respectively via the links 15 and 16.

The monitoring device 1 is part of a guidance system 2 of the aircraft AC. It is known that, generally, a guidance system 2 comprises, in addition to said calculation stage 3 for guidance orders, at least the following successive stages (not specifically shown):
  one calculation stage for the position of the aircraft;
  one management stage for the flight plane of the aircraft;
  one calculation stage for the position of the aircraft; and
  one calculation stage for deviations.

According to the invention, and as shown on FIG. 1:
  said calculation stage 3 for lateral guidance orders has an architecture comprising at least N pieces of equipment E1, E2, E3, each of which is provided at least with one large feedback loop 5 and is able to generate, in outlet of the associated large feedback loop 5, a roll control order, N being an integer higher than or equal to 3. The introduction of this redundancy allows to produce several comparable roll control orders; and
  said device 1 further comprises a failure monitoring device 18. Such failure monitoring device 18 comprises a comparison unit 17 comprising integrated elements:
    for making, automatically and repeatedly, comparisons, comparing therebetween, two to two, the roll control orders generated by said N large feedback loops 5 of said pieces of equipment E1, E2, E3, and received via the links 19 (linked to the links 15); and
    for determining and identifying, if applicable, from these comparisons, a piece of equipment being failing concerning the generation of lateral guidance orders of the aircraft AC, that is an equipment that is no longer able to generate valid (not erroneous) lateral guidance orders; and
  alarm devices 20 being linked via a link 21 to the failure monitoring device 18 and being formed so as to emit at least one (either visual or sound) warning in the cockpit of the aircraft AC, when a piece of equipment is regarded as having a failure by the failure monitoring device 18.

Thus, the device 1 according to this invention makes comparisons between the roll control orders generated by the N large feedback loops 5 of said N pieces of equipment E1, E2, E3, so as to be able to detect a diverging source as soon as an error occurs, that is as soon as a piece of equipment is failing concerning the generation of lateral guidance orders. Furthermore, this detection of failure is reliable.

The architecture according to this invention for the detection and the isolation of equipment or systems with a failure thus relies on a principle of triplex architecture (or with N pieces of equipment where N≥3 provides using three sources (pieces of equipment E1 to E3), or more, at least at the level of the calculation stage 3 for orders of guidance for slaving the aircraft on the trajectory, allowing to automatically detect and isolate the failures at the level of the calculation stage 3. Furthermore, the calculation stage 3 could be made up of identical equipment (symmetric stage) or different equipment (dissymmetric stage).

In a preferred not shown embodiment, each of the above mentioned stages of the guidance system 2 has such an architecture comprising at least N pieces of equipment.

Furthermore, when the failure monitoring device 18 determines that a piece of equipment is failing, maintenance devices 22 are informed about this failure, via the link 21, allowing more specifically to prepare the maintenance operations for the replacement of the piece of equipment with a failure.

Furthermore, in a particular embodiment, the analysis of the orders coming from each chain of calculation is implemented by the defective valve isolation device 14. The defective value isolation device 14 aims at comparing the orders coming from each guidance string and isolating the defective values. They transmit afterwards a valid order to the small feedback loop 12. This known principle allows the impact to be omitted of any simple failure of a guidance string on the trajectory of the aircraft AC. With this type of architecture, it is possible to passivate an erroneous guidance order so that the latter does not affect the trajectory of the aircraft AC. This solution of passivation does not however identify the source of the error, this being on the other hand implemented by the failure monitoring device 18 according to this invention.

The determination and the exclusion of a source of erroneous lateral guidance orders enable more specifically, to meet the following objectives consisting in:
  informing the crew about the failure of the piece of equipment, by the alarm devices 20;
  avoiding use of a source, with a proven failure, by exclusion using the defective value isolation device 14; and
  preparing the maintenance operations for the replacement of the piece of equipment with a failure, as a result of the information supplied to the maintenance devices 22.

In the basic embodiment of FIG. 1, by monitoring the roll control orders generated by the N large feedback loops 5, having a direct impact on the trajectory of the aircraft, the failure monitoring device 18 are able to identify a failure once it is directly observable.

For anticipating the occurrence of the anomaly before failure occurs, an additional mechanism is provided in the preferred embodiment of FIG. 2. Its principle involves monitoring at least one inlet parameter of the transfer function of the large feedback loops 5.

In this preferred embodiment, the failure monitoring device 18 comprises a failure anticipation comparator device 23 for determining, if applicable, anticipatively, a piece of equipment being failing concerning the generation of lateral guidance orders of the aircraft AC.

In this preferred embodiment, the failure monitoring device 18 is linked via the links 24 to the inlets of the large feedback loops 5 of the equipment E1 to E3 for recovering the values of one or more inlet parameters, as shown on FIG. 2. For clarity reasons, the links 10 and 13 and the flight plane sensors 8 are not shown on this FIG. 2, although they are also present on the system 2.

The failure anticipation comparator device 23 comprises the integrated elements for implementing, for each piece of equipment E1 to E3, the following operations consisting in:
  calculating the deviations between the value of the inlet parameters being considered by this piece of equipment and each of the values of the inlet parameter considered by each of the other pieces of equipment;
  comparing each of the thus calculated deviations to an auxiliary monitoring threshold; and
  considering that said piece of equipment has a failure if all the corresponding deviations are higher than said auxiliary monitoring threshold.

Preferably, the failure anticipation comparator device 23 uses at least one of the following inlet parameters:
  a deviation of position of the aircraft AC with respect to the trajectory, which affects the roll control order for correcting this deviation;
  a deviation of orientation of the aircraft AC with respect to the trajectory, which affects the roll control order; and
  a nominal roll representing the roll control order applicable by default for a next turn.

Said nominal roll is calculated in phase lead compared to the next turn. Its monitoring allows a building failure of the trajectory to be anticipated. This information may be employed for invalidating a defective equipment before it could generate an erroneous roll control order.

In a particular embodiment, the failure anticipation comparator device 23 simultaneously analyze the values of several of the inlet parameters, for monitoring a piece of equipment concerning the generation of lateral guidance orders. By way of illustration, the monitoring of the above mentioned position and orientation deviations, if they are combined, allows for identifying a problem of definition of the flight plane or the trajectory built therefrom. Their impact is instantaneous on the roll control order.

In addition, the failure monitoring device 18 considers:
  that a source is (at least temporarily) regarded as having a failure as soon as it goes out of the predefined monitoring threshold; and
  that a source is confirmed as having a failure as soon as exceeding the threshold (monitoring threshold or auxiliary monitoring threshold) is confirmed for a predefined period of time.

In a preferred embodiment, shown on FIGS. 1 and 2:
  said pieces of equipment E1, E2, E3 are integrated each in a flight management system S1, S2, S3 of the Flight Management System ("FMS") type; and
  a failure monitoring means device 18 is integrated in at least one flight control and guidance system S4 of the Flight Control and Guidance System ("FOGS") type.

In a RNP-AR context, the detection of an anomaly on one of these parameters results in a defective (flight management) system 51, S2, S3 being notified to the maintenance devices 22 and in warnings (by alarm devices 20) being triggered in the cockpit for notifying the crew. The architecture and the above described different monitoring functions thus allow the aircraft AC to meet the safety requirements inherent to RNP AR operations, being able to automatically detect, identify and isolate a system with a failure.

The monitoring mechanism according to this invention thus operates:
  basically (FIG. 1), from orders of turning initiation, in outlet of the transfer function of the large guidance loop; and
  in addition (FIG. 2), from inlet parameters of the transfer function of the large guidance loop.

It should be alternatively noticed that:
  the triplex architecture described in the above mentioned particular embodiments could be replaced by a larger number of redundancies for each of the contributors of the function; and
  each contributor could also have an internal architecture, having its redundancies not based on the same systems.

The invention claimed is:

1. A method for monitoring lateral guidance orders provided for a flight control system of an aircraft that is provided with a calculation stage for lateral guidance orders, the calculation stage including at least N pieces of equipment, each of which is provided with at least one of a sensor and a trajectory management device able to generate an inlet parameter, and each piece of equipment also provided with one large feedback loop that is able to generate a turning initiation order corresponding to a roll control order from the inlet parameter, N being an integer higher than or equal to 3; and at least one small feedback loop, determining, from the roll control order, the lateral guidance orders of the aircraft, the method comprising:

determining, with the large feedback loops of each the at least N pieces of equipment, a turning initiation order corresponding to a roll control order, by using inlet parameters generated from the corresponding at least one of the sensor and the trajectory management device;

determining, from the roll control order, with the at least one small feedback loop, the lateral guidance orders of the aircraft;

comparing, automatically and repeatedly with a comparison unit of a failure monitoring device, the roll control orders generated by the N pieces of equipment;

determining from the comparisons of the roll control orders, with the failure monitoring device, that a piece of equipment is failing concerning the generation of lateral guidance orders of the aircraft;

emitting, with alarm devices, when a piece of equipment has a failure, at least one warning, which identifies the piece of equipment that has a failure, in a cockpit of the aircraft, comparing, automatically and repeatedly with a failure anticipation comparator device included in the failure monitoring device, values relative to the inlet parameter, used respectively by the pieces of equipment to determine the roll control orders;

determining from the comparisons of the values relative to the inlet parameters, with the failure monitoring device, that, a piece of equipment is anticipated to fail concerning the generation of lateral guidance orders of the aircraft; and emitting, with alarm devices, when a piece of equipment is anticipated to fail, at least one warning, which identifies the piece of equipment that is anticipated to fail, in the cockpit.

2. The method of claim 1, wherein, for each selected piece of equipment, the determining that a piece of equipment is failing further includes:

calculating deviations between the roll control order generated by the selected piece of equipment and each of the roll control orders generated by each of the other pieces of equipment;

comparing each of the calculated deviations to a monitoring threshold; and determining that the selected piece of equipment has a failure if all the calculated deviations are higher than the monitoring threshold.

3. The method of claim 1, wherein, for each piece of equipment, the determining that a piece of equipment is anticipated to fail further includes:

calculating deviations between the value relative to the inlet parameter being considered, used by the selected piece of equipment, and each one of the roll values relative to the inlet parameter, used by each of the other pieces of equipment;

comparing each of the calculated deviations to an auxiliary monitoring threshold; and determining that the selected piece of equipment is anticipated to have a failure if all the calculated deviations are higher than the auxiliary monitoring threshold.

4. The method of claim 1, wherein at least one of the selected following inlet parameters is used during the comparing by a failure anticipation comparator device:

a deviation of position of the aircraft with respect to a trajectory;

a deviation of orientation of the aircraft with respect to the trajectory; and a nominal roll.

5. The method of the claim 1, further comprising:

repeating the steps of comparing by a failure anticipation comparator device and determining that a piece of equipment is anticipated to fail, by using values of several inlet parameters simultaneously to enhance monitoring a piece of equipment with respect to the generation of lateral guidance orders.

6. The method of claim 1, wherein, when it is determined that a selected piece of equipment is failing, the method further comprises:

informing, with the failure monitoring device, maintenance devices about the failure so that corrective maintenance is actuated on the selected piece of equipment.

7. The method of claim 2, further comprising:

determining that a selected piece of equipment definitely has a failure if all the calculated deviations are higher than the monitoring threshold for a predetermined period of time.

8. A device for automatically monitoring lateral guidance orders of an aircraft, the device comprising:

a calculation stage for lateral guidance orders, being provided for a flight control system, the calculation stage comprising: at least N pieces of equipment, each of which is provided with at least one of a sensor and a trajectory management device able to generate an inlet parameter, and each piece of equipment also provided with one large feedback loop that is able to generate a turning initiation order corresponding to a roll control order from the inlet parameter, N being an integer higher than or equal to 3;

at least one small feedback loop, determining, from the roll control order, the lateral guidance orders of the aircraft, a failure monitoring device being formed so as to make, automatically and repeatedly, comparisons, comparing therebetween the roll control orders generated by the N pieces of equipment, and to determine, from the comparisons of the roll control orders, that a piece of equipment is failing concerning the generation of lateral guidance orders of the aircraft, and an alarm device that emits at least one warning, which identifies a piece of equipment that has a failure, in a cockpit of the aircraft, when the piece of equipment has a failure;

wherein the failure monitoring device includes a failure anticipation comparator device that anticipates failure of a piece of equipment concerning the generation of lateral guidance orders of the aircraft, the failure anticipation comparator device making for at least one inlet parameter of the large feedback loops, comparisons of values relative to the inlet parameter, used respectively by the large feedback loops of the pieces of equipment, and to determine from the comparisons of the values relative to the inlet parameter, anticipatively, that a piece of equipment is anticipated to fail concerning the generation of lateral guidance orders of the aircraft, and wherein the alarm device emits at least one warning, which identifies a piece of equipment that is anticipated to have a failure, in the cockpit, when the piece of equipment is anticipated to have a failure.

9. A guidance system of an aircraft, the guidance system comprising
the device of claim 8.

10. The guidance system of claim 9, wherein the failure monitoring device is integrated in a guidance and control calculator of the guidance system.

11. An aircraft comprising the monitoring device of claim 8.

12. An aircraft comprising the guidance system of claim 9.

13. The method of claim 1, further comprising:
isolating flawed roll control orders generated from any of the pieces of equipment that are determined to have a failure or determined to anticipate a failure, with a defective value isolation device communicating between the large feedback control loops and the at least one small feedback control loop, such that the flawed roll control orders are not transmitted for use by the at least one small feedback control loop during the determining of the lateral guidance orders.

14. The device of claim 8, further comprising:
a defective value isolation device connected to the large feedback control loops and to the at least one small feedback control loop, the defective value isolation device isolating flawed roll control orders generated from any of the pieces of equipment that are determined to have a failure or determined to anticipate a failure, such that the flawed roll control orders are not transmitted for use by the at least one small feedback control loop during the determining of the lateral guidance orders.

15. The device of claim 14, further comprising:
maintenance devices communicating with the failure monitoring device so as to be informed about any determined failures of a selected piece of equipment, so that corrective maintenance is actuated on the selected piece of equipment.

16. The guidance system of claim 9, further comprising:
a defective value isolation device connected to the large feedback control loops and to the at least one small feedback control loop, the defective value isolation device isolating flawed roll control orders generated from any of the pieces of equipment that are determined to have a failure or determined to anticipate a failure, such that the flawed roll control orders are not transmitted for use by the at least one small feedback control loop during the determining of the lateral guidance orders.

17. The guidance system of claim 16, further comprising:
maintenance devices communicating with the failure monitoring device so as to be informed about any determined failures of a selected piece of equipment, so that corrective maintenance is actuated on the selected piece of equipment.

* * * * *